United States Patent Office 2,923,730
Patented Feb. 2, 1960

2,923,730

DITHIOPHOSPHORIC ACID ESTERS AND THEIR PREPARATION

Gerhard Schrader, Opladen, Germany, assignor to Farbenfabriken Bayer Aktiengesellschaft, Leverkusen, Germany, a corporation of Germany No Drawing. Application October 11, 1956
Serial No. 615,234

Claims priority, application Germany October 13, 1955

4 Claims. (Cl. 260—461)

This invention relates to and has as its object the provision of new and useful dithiophosphoric acid esters, more particularly those of the following formula:

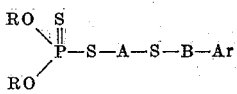

In this formula R stands for alkyl, especially lower alkyl radicals, A and B stand for alkylene especially lower alkylene chains and Ar means aryl especially phenyl radicals or substituted phenyl radicals (particularly those which are halo, nitro or lower alkyl substituted).

Many thiophosphoric acid esters have become very important in the field of insecticides or generally pesticides during the last years and intensive work has been done in finding more effective compounds especially such compounds with comparable lower toxicity against mammals.

In accordance with the present invention a new class of valuable insecticides has been found which corresponds to the above described formula; more particularly this invention is concerned with compounds of the formula:

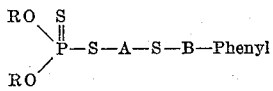

in which R, A and B have the significance as given before. Examples of such compounds are the O.O-dimethyl, O.O-diethyl, O.O-dipropyl, O.O-diamyl-dithiophosphoric acid which carry as an ester radical at the thiol-sulfur the benzylmercaptoethyl-, benzylmercaptomethyl-, p-methylbenzylmercaptoethyl-, p-chlorobenzylmercaptoethyl-, p-nitrobenzylmercaptoethyl-, 3 - chloro - 4 - nitrobenzyl-mercaptoethyl-, benzylmercaptopropyl-, benzylmercaptoisopropyl-, phenethylmercaptomethyl-, phenethylmercaptoethyl-, p - chlorophenylethylmercaptoethyl-, p-nitrophenylethylmercaptoethyl-, phenylpropylmercaptoethyl-group and the like.

The preparation of these compounds may be accomplished by reacting the corresponding aralkylmercaptoalkylhalide with the appropriate O.O-dialkyldithiophosphoric-salt (or the free acid in the presence of acid binding agents) exactly as described in U.S. Patent No. 2,759,010. The reaction may typically be shown by the following equation:

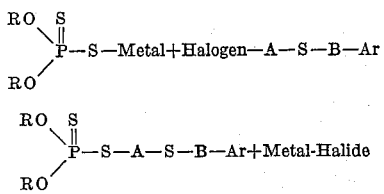

This reaction, as described in U.S. Patent 2,759,010 is preferably carried out in inert organic solvents at slightly elevated temperatures. Especially suitable for this reaction are the ammonium salts of dithiophosphoric acid esters.

It is, however, also possible to obtain these new esters by reacting the free O.O-dialkyl-dithiophosphoric acids with the corresponding aralkylmercaptoalkylhalide, thus splitting off hydrogen-halide which escapes. This reaction is described in copending application of Gerhard Schrader et al. Serial No. 554,378, entitled Process for the Manufacture of Neutral Thiono-Thiol-Phosphoric Acid Esters and filed November 20, 1955. Still another method for the preparation of the inventive compounds is to react thiophosphoric acid ester halides with the appropriate mercaptans.

The new compounds of the present invention very effectively kill insects like flies, mites, aphids, etc. Most surprisingly they are of remarkable low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers) alcohols, especially lower alcohols such as methanol or ethanol, ketones, especially lower ketones such as acetone or methylethylketone, liquid hydrocarbons and the like. The new compounds may furthermore be used in combination with each other or with known insecticides, fertilizers, etc.

The following example illustrates the possibilities how to prepare the inventive compounds, without, however, restricting the present invention thereto.

*Example*

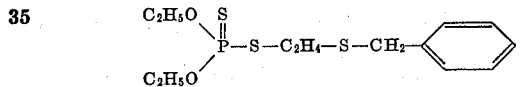

38 g. β-chloroethyl-benzyl-mercaptan are added dropwise at a temperature of 90° C. to a suspension of finely divided O.O - diethyl - dithiophosphoric acid - ammonium salt in 60 ml. butanol. The temperature is kept for further 15 minutes at 90° C. and then the reaction mixture is cooled. The precipitated ammonium chloride is removed by filtration or sucked off and then the butanol is distilled off. The remaining crude ester is purified by distillations, thus yielding 47 g. of the above ester, boiling at 0.05 mm. Hg at 171° C.

If instead of O.O-diethyldithiophosphoric acid the equivalent molecular amount (35 g.) of the dimethyl ester is used there is obtained the corresponding dimethyl ester of the formula:

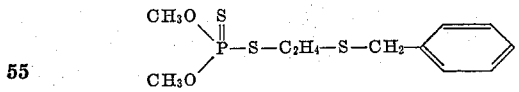

This methyl ester distills at 0.4 mm. Hg at 180° (with partial decomposition).

By using the equivalent molecular amount of p-chlorobenzyl-β-chloroethylmercaptan there is obtained the corresponding S-ethylmercapto-(p-chlorobenzyl) ester of the formula:

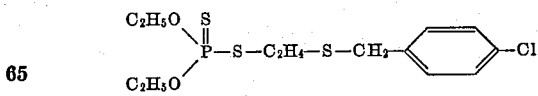

In an exactly analogous manner there may be obtained the following new compounds:

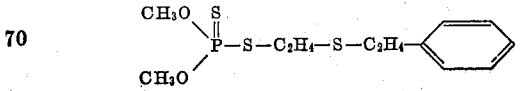

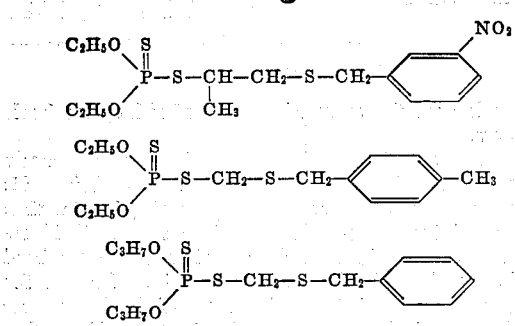

I claim:
1. A dithiophosphoric acid ester of the formula

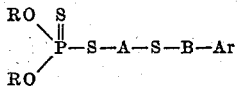

in which R stands for an alkyl radical having one to four carbon atoms, A and B stand for a lower alkylene chain and Ar stands for a member selected from the group consisting of phenyl, halophenyl, nitrophenyl, and lower alkylphenyl.

2. A dithiophosphoric ester of the formula

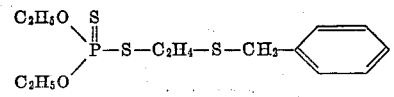

3. A dithiophosphoric ester of the formula

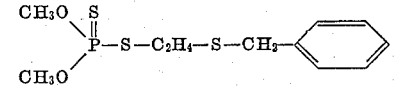

4. A dithiophosphoric ester of the formula

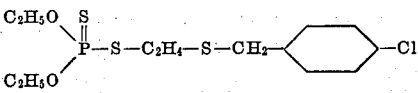

References Cited in the file of this patent
UNITED STATES PATENTS

| | | |
|---|---|---|
| 2,571,989 | Schrader | Oct. 16, 1951 |
| 2,586,655 | Hook et al. | Feb. 19, 1952 |
| 2,793,224 | Fancher | May 21, 1957 |

FOREIGN PATENTS

| | | |
|---|---|---|
| 998,052 | France | Jan. 14, 1952 |